INVENTOR.
JEROME H. LEMELSON
BY

INVENTOR.
Jerome H. Lemelson
BY

INVENTOR.
JEROME H. LEMELSON
BY

United States Patent Office 3,325,733

Patented June 13, 1967

3,325,733

MEASURING DEVICE USING VARIABLE THICKNESS THIN FILM TUNNELING LAYER

Jerome H. Lemelson, 85 Rector St., Metuchen, N.J. 08840

Filed Nov. 30, 1964, Ser. No. 414,677
9 Claims. (Cl. 324—103)

This invention relates to electrical devices employing thin films of dielectric material and is a continuation-in-part of my co-pending application Ser. No. 86,838 for Electrical Devices and Manufacture Thereof which was filed on Dec. 27, 1960, now Patent No. 3,169,892.

It has been discovered that a film of dielectric material when used to separate two electrical conductors which are in circuit with a power supply, with said film interrupting said circuit, will, if said film is thin enough, permit the tunneling of electrons therethrough and hence the flow of current between the conductors. Substantial current flow is exhibited if the potential is great enough and the film is in the order of a thickness of 10 to 100 layers of atoms, the quantity of flow being substantially proportional to the thickness of the film.

This invention contemplates the use of such thin dielectric films in the fabrication of new and improved electrical devices such as variable resistors, analog to digital converters, digital volt meters, variable capacitors, and the like, which employ a pair of conductors or a plurality of conductors, pairs of which are spaced apart by a dielectric film which segmentally varies in thickness or so varies with length as to provide a variable resistance to current flow. The invention as mentioned is also concerned with the method of fabricating such devices and more particularly with a method for fabricating a dielectric film of variable thickness.

It is accordingly a primary object of this invention to provide new and improved electrical devices for performing various circuit functions.

Another object of the invention is to provide a method and apparatus for fabricating electrical components.

Another object is to provide a new electrical device employing a dielectric film which varies in thickness along the length or surface thereof.

Another object is to provide a new and improved variable discharge device which may be used as a variable switch which will operate above a preset voltage value.

Another object is to provide an improved variable potentiometer.

Another object is to provide a new and improved analog to digital convertor.

Another object is to provide an improved variable signal clipper.

Another object is to provide a new and improved and simplified digital volt meter.

Another object is to provide new and improved electrical devices employing thin semi-conducting films deposited as strips or other-shape structures which vary in cross-section or configuration and serve as means for gating or tunneling current of predetermined characteristics between two or more conductors operatively connected thereto and separated from each other thereby.

Another object is to provide methods for fabricating electrical devices having films of variable cross-section and are deposited from the vapor state.

Another object is to provide new and improved methods for fabricating electrical devices by electrical discharge means and means operative to control the rate of deposition onto selected areas of a substrate.

With the above and such other objects as may hereinafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

Figure 1:
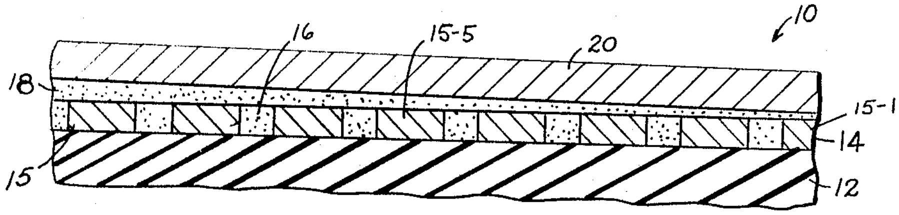
FIG. 1 is a side cross-sectional view of a fragment of an electrical device having a tapering dielectric or semi-conducting film forming part of the device and separating a plurality of conducting elements.

FIG. 1 illustrates in cross section a portion of an electrical device having various applications, certain of which will be described hereinafter and, which comprises a plurality of layers of conducting and non-conducting material. The assembly 10 preferably includes a base support 12 for said conducting and non-conducting layers which may be of any suitable rigid or flexible material which is preferably a dielectric, although in certain instances, it may comprise a semi-conducting material or a conducting material having its upper surface covered, coated or converted to a dielectric layer or film. It is to be noted that FIG. 1 is not necessarily drawn to scale and the components thereof have been intentionally drawn out of proportion in relation to each other for the sake of clarity of exposition.

Figure 2:
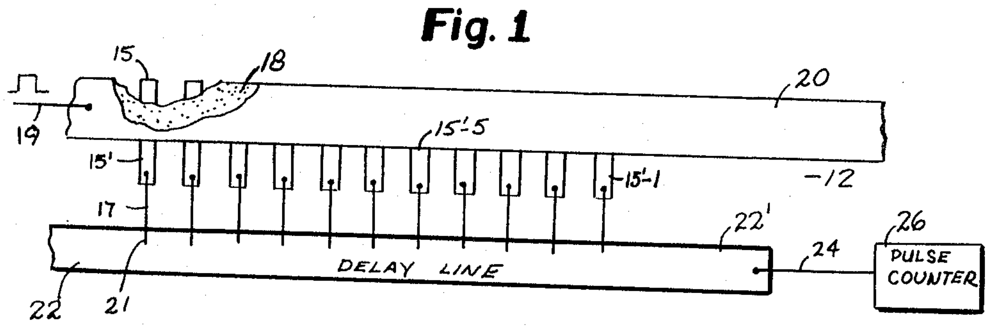
FIG. 2 is a plan view showing features of the device of FIG. 1 and additional elements connected thereto to define an electrical circuit.

Secured to the upper surface of base support substrate 12 is a layer 14 consisting of a plurality of spaced thin electrical conductors 15. Conductors 15 are preferably elongated thin strips of metal sheet or film as illustrated in FIG. 2. They may be provided on the surface of base support 12 by the so-called printing or etched circuit techniques or may be sprayed, electro-deposited from a solution or vacuum deposited as a series of thin film strips. The notation 16 designates spaces between each of the conductors 15 which are illustrated as being filled with a dielectric material. The dielectric material may be any suitable dielectric applied to the surface of base support 12 by any known and suitable technique or may be strips of the original metal layer 14 which have been totally converted to the dielectric compound of such metal by exposure to the proper oxidizing atmosphere as described in my co-pending application. Disposed on the upper surface of layer 14 is a thin layer or film 18 of dielectric material. Film 18 is illustrated as tapering or progressively reduced in thickness from left to right. The thickness reduction is preferably linear or in proportion to the length of film 18 which extends laterally across the conducting elements or strips 15. As hereinabove set forth, a dielectric film of a material such as aluminum oxide or the like in the order of ten to one hundred atoms thick, will permit the flow of electrons therethrough in proportion to the voltage applied thereto. By utilizing a variable thickness film such as the tapered film 18 of FIG. 1, each portion of the film covering a respective one of the conducting elements 15 therebeneath will permit passage of a different maximum voltage to its respective conductor than those portions of the film adjacent other conductors. For example, since the film adjacent the conductor 15–1 is thinner than the film adjacent the conductor 15–5 to the left thereof, current into film above conductor 15–5 will require a greater minimum voltage to pass therethrough to conductor 15–5 than a current applied above the film covering conductor 15–1 for passage to conductor 15–1. In other words, the same current which supplied by potential sufficient to cause a flow of electrons to the conductor 15–1 may not have sufficient voltage to cause a similar flow to the conductor 15–5. This phenomena may be utilized in a number of different devices including the assembly of FIGS. 1 and 2 which may be utilized for the indication of voltage, pulse train generation and for other purposes.

Positioned directly above the tapered film 18 is a flat strip conductor 20 which may be a strip of metal bonded thereto, or a film or coating of metal which is deposited thereon by printing, spraying, vacuum deposition or electro-deposition or any other known technique. In a preferred form of invention, the conductors in the layers 14 and 20 are preferably vacuum deposited on the respective surfaces which support them. The tapered dielectric film 18 is preferably formed from a tapered film of metal which is vacuum deposited on the upper surface of layer 14 by a technique to be described hereinafter and completely converted to a dielectric compound of such metal by its exposure to the proper oxidizing atmosphere for such time period required to completely effect the conversion and prior to the application of conducting layer or film 20 thereon.

The passage or tunnelling of electrons through a dielectric film has been observed for films having thicknesses in the range of 10 to 100 atoms layers or in the range of one ten-millionth of an inch. Heavier dielectric films may also be utilized depending upon the voltages applied to the device. The tapered dielectric film 18 of the device 10 may therefore vary from .00001 inch thick or less near one end thereof to .0000001 inch thick or less near the other end thereof for applications in which the so-called "cold tunneling" effect is desired. In actual scale, the cross section of the devices would be quite different from that illustrated in FIG. 1 if the conducting strips were to be provided by vacuum or electro-deposition upon the base 12 since these strips would have tapering or feathered edges and would be spaced proportionately farther apart. The vacuum deposited dielectric film 18 would, of course, follow the contour of each of conductors 15 and could be made to fill out the cavities or voids between the conductors. The conductors 15 and 20, in a preferred form of the invention, may be thin metal films in the order of several microns or less in thickness and one or both may be made super-conducting depending on the application of the device.

In the device illustrated in FIG. 2, conductors 15 are shown spaced from each other a considerable distance in the interests of clarity of description although they need be no further apart than the maximum thickness of the dielectric film 18 in order for the device to function. Each of conductors 15 extends laterally beneath and projects beyond the elongated capping strip 20 as portions 15'. Such portions 15' are electrically connected through conductors 17 to respective points along a delay line 22. The delay line 22 may be of any suitable design such as a so-called sonic delay line or a solid-conducting delay line. the notation 21 designates the connection of each extension 17 of the conductor 15 to a respective point along the length of the delay line 22. The far end 22' of the delay line 22 has an output line 24 which connects to a computing device 26 such as a pulse counter. The upper conductor 20 of the sandwich assembly 10 is adapted to be operatively connected to a source of unknown voltage (not shown) by means of an input line 19.

Operation of the device of FIG. 2 as a means for providing a numerical or signal indication of an unknown volage by applying a short pulse from said unknown voltage to the input line 19 is described as follows. Assuming, for the sake of illustration, that the voltage of the pulse applied to input line 19 is of such a magnitude that it will cause a flow of electrons through the dielectric film 18 separating conducting layer 20 from base conductor strip 15–5 and through all strips 15 to the right or clockwise position thereof but that electrons will not pass through those conductors 15 to the left or counterclockwise of conductor 15–5 due to the greater thickness of the film separating the latter strips from the conducting layer 20, than the voltage pulse will appear substantially at the same time at each of the terminals 21 connecting each of the conductos (15–5 to 15–1) with the delay line 22. Since component 22 is a delay line, if the pulse generated on the input 19 is short entough, a pulse train will be generated in delay line 22 since the terminals 21 are spaced therein and such pulse train will appear on the output line 24. If the device 26 is a pulse counter, it may be used to numerically indicate voltage since the number of pulses received thereby as the result of a single pulse present on the input line 19 will be indicative of the voltage, the value of which may be derived by calibration. Since the conductors 15 have a finite width and are spaced a finite distance from each other, the number of pulses appearing on the output line 24 will actually be indicative of a voltage range which range may be reduced to substantially an absolute value by reducing the width of the base conductors 15 and the distance they are spaced from each other.

In order to obtain more precise values of voltage, two or more strip assemblies such as those comprising the base conductors 15, variable dielectric interlayer 18 and capping strip 20, may be provided in parallel circuit arrangement with each other with the strips of one interposed in positions between those of another and connected either to the same or different delay lines. A single pulse of an unknown voltage may be provided on the input lines 19 to each of the capping strips 20 which will generate either a single pulse train of closer spaced pulses or a pulse train in each delay line. If two delay lines are utilized, separate pulse counting devices may be provided, one for each, the summation of which is indicative of the voltage of the input pulse.

In another form of the invention, the strip 20 may comprise an electrical delay line from which all the output lines 15' of the base conductors 15 would be connected to a common output line which would receive a pulse for each of the base conductors including that below or to the right of that which first passes the input pulse through its dielectric coating or film. The common output would be connected to a pulse counter 26, recorder or visual indicating device which is operated in proportion to the number of pulses it receives.

The device of FIG. 2 may also be used as a means for generating a predetermined number of pulses on a line such as line 24 for computing purposes. By varying the input voltage to line 19, the length or number of pulses in the pulse train may be proportionately varied. The device 26 may also comprise a means for converting the digital pulse train appearing on the delay line output 24 to a binary pulse code.

Figure 3:
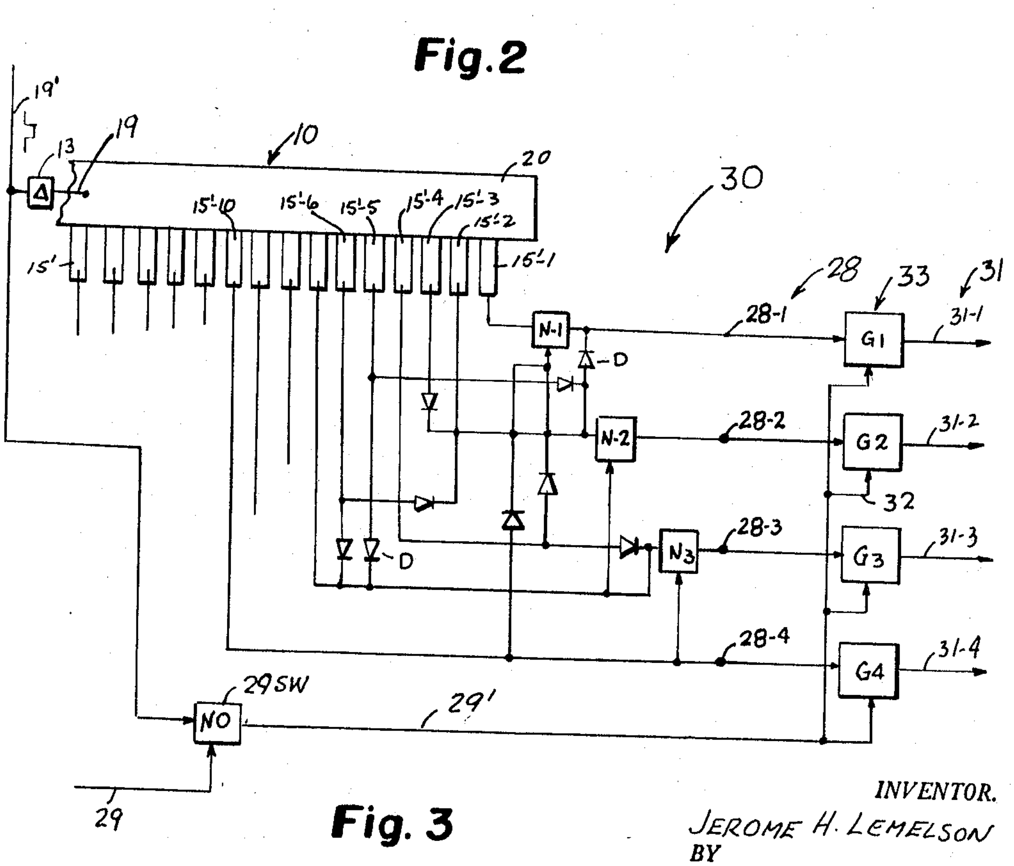
FIG. 3 is a plan view of a modified form of the device of FIGS. 1 and 2.

In FIG. 3, an assembly 10 of electrical elements, as described hereinabove, is provided with further circuits for providing a parallel binary code indicating the voltage of an input signal. The signal appearing on the input line 19' need not necessarily be a short pulse and may comprise either a signal of constant voltage or an analog or variable voltage signal, the instantaneous value of which will provide an instantaneous binary code array of energized and deenergized parallel output circuits 28 from the device. In other words, the device 30 of FIG. 3 provides for the direct binary digital indication of voltage without the need for providing a more complex analog to digital conversion device.

Assuming that the appearance of a signal on one of the output circuits 28 may be designated by the binary notation 1 and the lack of a signal by the binary notation "0," then the plurality of outputs 28 are so connected to the respective outputs 15' of the base conductors 15 of assembly 10 that the binary code appearing on such parallel outputs will be indicative of the number of base conductors 15 receiving current from the capping strip 20. For example, assuming that the voltage appearing on strip 20 is so low that it only passes through the thinnest portion of the tapering or reducing dielectric layer 18 and flows only to the base conductor 15'–1 which is the most clockwise or at one end of strip 20. This signal will then appear on line 28–1 but not on any of the other lines and hence the binary notation "1" is provided on the parallel circuits 28 indicating the decimal numeral "1." If the voltage is such that the signal appears on both conductors 15'–1 and 15'–2 the line 28–2 is energized by passing the signal directly from conductor 15'–2 thereto but line 28–1 is not energized. Prevention of the signal generated on conductor 15'–1 form passing to line 28–1 is effected by means of a so-called logical "Not" switching element N–1 which is essentially a normally closed electronic switch having a switching input to effect its opening which is connected to conductor 15'–2. In other words, when conductor 15'–2 is energized, switch N–1 opens so that no signal appears on line 28–1. Energization of line 28–2 results in a binary notation of "1" and deenergization of line 28–1 results in a binary "0" giving the combined binary number "10" which is equivalent to the decimal number "2."

Similarly, if the three conductors 15'–3, 15'–2, and 15'–1 are simultaneously energized by a still higher voltage, then the binary notation "11" is effected on lines 28–1 and 28–2 since conductor 15'–3 is connected directly to line 28–1 and by-passes switch N–1. The notation "D" designates diodes which are provided in the various circuits that are illustrated to assure current flow only in one direction to prevent a signal or signals appearing in one circuit from being conducted to one or more other circuits connected thereto.

In a similar manner, the extension conductor 15'–4 of the base element conductor 15–4, which is the fourth base element conductor from the right, when energized together with those elements to the right thereof by a voltage which will not pass through the heavier dielectric film portions to the left thereof, will provide the binary number "100" which is representative of the decimal numeral "4." A voltage energizing 15–5 and all the base strips to the right thereof will provide the binary number "101" which represents the decimal number "5." A voltage appearing on input 19 which is sufficient to cause tunneling on only the space element 15–10 and all to the right thereof will cause energization of circuit 28–4, de-energization of 28–3 by the opening of normally closed switch M–3, energization of 28–2 and deenergization of 28–1 by the opening of normally closed switch N–1. This is equivalent to the binary notation "1010" which represents the decimal number "10."

If it is desired to obtain a direct binary indication of an instantaneous voltage which may be part of a variable voltage or analog signal or one of a plurality of pulses to be sampled, a normally opened gate such as a switching transistor, tunnel diode, vacuum tube or the like may be provided at each of the circuits 28. Such normally opened gates are illustrated and referred to by the notations G1, G2, G3, etc. each of which has a switching input 32 which is connectable to the signal input line 19' thru a normally opened switch 29SW. If a delay relay or delay line 13 is provided in the circuit between the input 19 to 20 and input 19', then the signal generated on 19' will first appear on the switching inputs to all of the normally opened switches G. The binary notations or signals appearing on the circuits 28 will therefore pass through the switches of bank 33 as long as they remain closed. Sampling of instantaneous indication of the voltage appearing on input 19' may be controlled by pulsing the input 29 to the normally opened switch 29SW to close it for a sufficient period of time to retain the switches of bank 33 closed. Energizing of control line 29 may be effected by means of a clock, computing device, manual operated switching means or the like. It is noted that line 29 may be also directly connected of the switching inputs to the switches G1, G2, G3, etc. Line 29 may also be energized by a portion of the signal appearing on input 19'. For example, if it is desired to sample or indicate by binary notation only a voltage appearing on input 19' which is above or below a certain value or falls within a range or ranges of voltages, then a suitable clipping circuit or the like may be connected between input 19' and line 29 which will cause energization of line 29 when a predetermined voltage or voltages appear at input 19' at which it may be desired to obtain a binary indication of the voltage or voltages. By retaining the gates in bank 33 closed for a period of time while a variable voltage signal or analog signal appears at input 19, the outputs 31 will provide a variable binary indication of such voltage which may be recorded, sampled or otherwise utilized for indicating and/or control purposes.

If a control device such as a clipping circuit, integrating or differentiating circuit is applied between the input 19' and line 29, the device 30 of FIG. 3 may be utilized for voltage control purposes.

Figure 4:
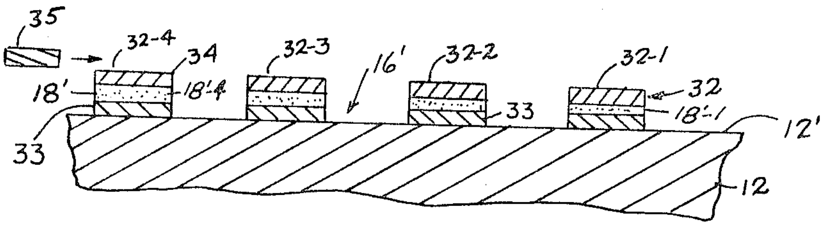
FIG. 4 is a side cross-sectional view of a fragment of an electrical device having a plurality of dielectric or semi-conducting portions and conducting elements separated from each other.
Figure 5:
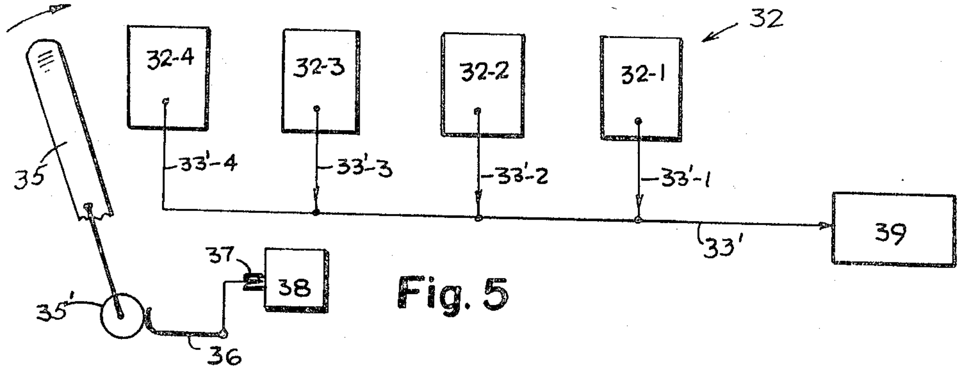
FIG. 5 is a schematic diagram of the device of FIG. 4 showing its use in a circuit.

In FIGS. 4 and 5, a base member 12 of insulating material having a flat upper surface 12' has a plurality of sandwich assemblies 32 intergrally secured thereto. The sandwich assemblies designated by the notations 32–1, 32–2, 32–3, 32–4, etc. each consist of a base strip 33 of conducting material such as a metal film, coating, or strip having an insulating layer 18' coating its upper surface and a second conductor 34 coating or otherwise being bonded to the insulating layer 18' and being insulatedly supported by base strip 33 thereby. The insulating interlayer 18' of each sandwich assembly 32 is of a different thickness than those of the other sandwich assemblies and are denoted 18'1, 18'2, etc. If the thickness of the upper conductor 34 and the lower conductor 33 of each of the assemblies is the same, the insulating film interlayer 18' of each will permit the passage of a different minimum current than those of the other sandwich assemblies. In other words, if either of the conducting portions of assembly 32–4 is connected to a source of potential and the other is grounded, since the insulating interlayer or film 18' thereof is of greater thickness than the insulating interlayer of the assemblies to the right of sandwich assembly 32–4, then the minimum voltage at which the current will flow through the insulating layer for sandwich assembly 32–4 will be greater than the minimum voltage required for current to flow through the insulating film or interlayers of sandwich assemblies 32–3, 32–2, and 32-1. In other words, if the same voltage is applied to each of the upper electrodes or contacts 34 of the four assemblies 32 illustrated in FIG. 4 which voltage has a value such that it will flow between the conductors of sandwich assembly 32–3 but is not great enough to overcome the resistance of the insulating film interlayer of sandwich assembly 32–4, such current will also tunnel between the insulating interlayers of assemblies 32–1 and 32–2 since these are thinner than sandwich assemblies 32–3 and 32–4.

A means for indicating a particular voltage may be provided by progressively energizing or contacting each of the upper conductors 34 of the assemblies 32 of FIG. 4 with an electrode or other source of unknown potential until a current flow between the upper and lower conductors of a particular assembly is perceived. In FIGS. 4 and 5, the notation 35 designates a sliding contactor or brush which is guided in a rotary or linear path across the upper surfaces of the upper conductors 34 of each of the assemblies 32. If the brush 35 sweeps past assemblies 32–4, 32–3, 32–2, and 32–1 and is energized by a voltage sufficient to cause current flow through the dielectric interlayer or film of the latter three but not between the conductors of assembly 32–4, then 3 pulses may be generated on a common output line 33′ which are indicative of the voltage connected to brush 35. The base strip 33 of each of the assemblies is shown connected via lines 33′–4, 33′–3, 33′–2, and 33′–1 to a common output line 33′ which is operatively connected to a pulse counter 39 which indicates electrically or visually the unknown potential of brush 35. The source of unknown potential, 38, is illustrated in FIG. 5 as being connected by means of a plug-jack assembly 37 to a brush 36 which rides on a slip-ring 35′ which rotates with the sliding contactor 35 which may be manually or servo operated to sweep past the upper electrical strips 34 in a given direction. The device 32′ may be used as a digital voltmeter or for other purposes including control of electrical devices, recording or feedback and the like.

It is also noted that the sliding contactor or brush 35 may be replaced by other electrical coupling means such as a stream of mercury directed selectively or one at a time against the surfaces of the conductors 34 in a sweeping motion past them and which is energized with the unknown voltage or by an electron beam, the potential of which is to be measured. An electron beam device utilizing the components of FIGS. 4 and 5 would of course require that at least the upper contactors 34 of each assembly be enclosed within an air evacuated envelope or vacuum tube and the beam would be controlled to sweep past each of such upper conductors 34 while striking only one at a time. The potential generated in each of the contactors is passed only to those base strips 33 which are covered with a dielectric film the thickness of which is not too great to prevent a tunneling or flow therethrough.

If a beam such as the beam generated in a cathode ray tube is utilized as the means for selectively or individually causing a potential to be generated in the individual assemblies, the assemblies 32 may be arrayed either circularly on the inside face of the cathode ray tube, in a spiral array of progressively increasing or decreasing dielectric interlayer thickness, or in a columnar or raster array whereupon the beam would have automatic deflection control means associated therewith for tracing a predetermined path across the individual surfaces of the assemblies. In such a structure the voids 16′ between the sandwich assemblies would be filled with a dielectric material to prevent the beam from flowing directly to the lower conducting elements 33 or the lower conducting elements may be exposed exterior of the face of the tube or beyond a wall provided therein.

For certain types of circuit functions, contactor 35 may be motor or manually positioned, set or secured to a selected assembly 32 against either the upper conductor 34 or the outer surface of material 18′ for use in a circuit to perform a particular control or gating function. In such an arrangement, the device may be used as a threshold switch, fixed voltage regulator, clipper, control or gate operative to pass all signals or portions of signals above a minimum voltage depending on the characteristics and thickness of the insulating or semi-conducting material 18′. In another form of the invention, one or more rotating brushes similar to brush 35 may be set or fixed with respect to either the upper surface of either layer 18 or 20 of FIG. 1 as input leads or performing the hereinabove described functions of voltage indication, voltage regulation, signal clipping, gating or control.

If the material comprising layers 18 or 18′ is temperature sensitive, that is, will vary in its ability to pass a minimum voltage or have tunneling characteristics depending on the temperature thereof, then the devices hereinabove described may be used for digital temperature indication, temperature control or as a relay means operative to pass current when a particular temperature thereof has been reached in accordance with the particular location of the input line with respect to the tapered dielectric or semi-conducting film (i.e. the thickness of that portion of the film aligned with the portion of input device 35 engaging it or secured thereto).

It is to be noted that the base elements 33 of each of the sandwich assemblies 32 illustrated in FIG. 4 may all be replaced by a single conducting strip or film of metal which may function as at least part of the common output line 33′ and the means for receiving current tunneled through certain of the dielectric portions of each assembly. Similarly, the dielectric layers 18′ may be replaced by a single tapered or variable thickness film of dielectric material extending across the single base strip 33. In other words, it is only necessary to provide the upper or contacting conductors 34 as separate conductors for the device to function as described. The structure may thus be assembled by first depositing metal on the upper surface 12′ or bonding a sheet or strip of metal thereto, then depositing a variable thickness of film of metal such as aluminum thereon, then converting said variable thickness or tapering film of metal to the dielectric compound of the metal by exposure to the proper oxidizing atmosphere for the required time to effect the conversion, then vacuum or electro-depositing at least part of the upper metal portion 34 against the upper surface of layer 18′. If a sliding or brush contact is to be utilized to provide a potential on each of the upper conductors, the strips 34 may each comprise a lamination of a metal film or coating applied directly to the upper surface of the dielectric film and a strip of flat metal sheet molecularly bonded, soldered or welded thereon, the upper surface of which is utilized for sliding contact with the brush element 35. The assemblies 32 or the upper conducting elements 34 may be spaced substantially closer together than illustrated, it being only necessary that the gap between the upper elements be no greater than the thickness of the dielectric film of the assembly or contactor to the left thereof.

If the brush element 35 is manually positionable and adapted to be retained against a selected upper conducting strip 32, the device of FIG. 5 may be utilized as a variable thyratron which will provide a pulse output on line 33′ only when a voltage is present on the input (35) which is great enough to cause the current to tunnel through the dielectric interlayer of the particular strip contactor 34 against which it is resting.

Figure 6:
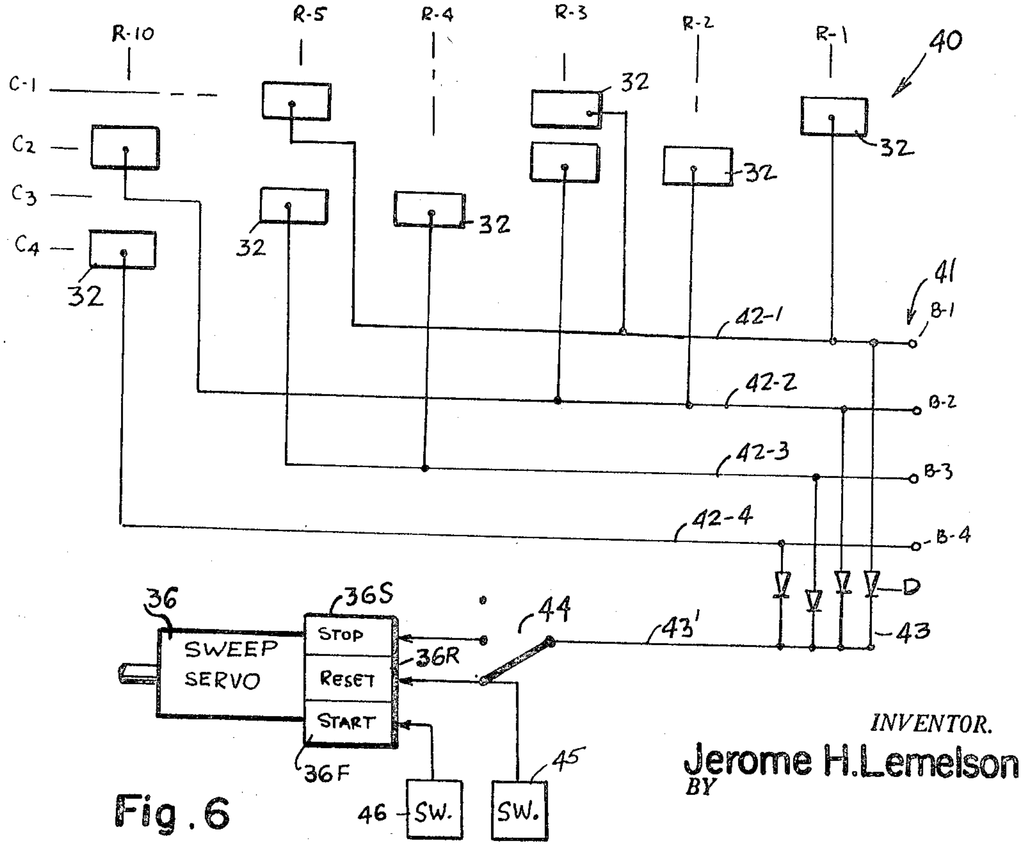
FIG. 6 is a schematic diagram of a modified form of the device of FIG. 5.

FIG. 6 illustrates a portion of a device for providing a binary coded output indication of the amplitude or voltage of an input signal which is present on an input line such as a sweep contactor or brush such as brush 35 of FIG. 5 when the contactor is in alignment with a particular row or column of surface conducting elements or assemblies such as assemblies 32. Although FIG. 6 illustrates a matrix-like array of such sandwich assemblies 32, such array may have any shape and, in a preferred form, may comprise a circular formation of equi-spaced, equi-area contractors such as illustrated arranged in radial columns designated by the notations R–1, R–2, R–3, R–4, etc. each of which may contain a plurality of assemblies 32, each of which is in a different circular row which rows are designated by the notations C–1, C–2, C–3, etc. In other words, a brush contactor such as Brush 35, if rotated about an axis which is the center of the circular array of such assemblies, will simultaneously contact all of the assemblies which may be positioned along a particular radius. The shape of the brush and of the upper conducting elements 34 is preferably such that the brush will simultaneously break contact with all surface conducting elements 34 in a particular radial column during its sweep in either the clockwise or counterclockwise direction. The dielectric interlayer for all assemblies or surface contacting elements 34 in a particular radial column is preferably the same thickness but different in thickness than the dielectric interlayer of the radial columns to either side.

The device 40 of FIG. 6 may be utilized to give a binary indication both of the radial column in which a particular voltage first tunnels through the dielectric interlayer of the column and of the position of the brush element 35, provided that the brush element is in alignment with a column having a dielectric film which will pass current.

Assuming that the thickness of the dielectric film 18' increases from right to left or counterclockwise in FIG. 6 and that the brush rotates clockwise, then the first column having a dielectric film thin enough to permit passage of the current to the base conductor or conductors will provide a binary indication of the position of the brush and hence an indication of voltage. The following examples will serve to further describe the device and illustrate its operation. Assuming first that a current is present on the brush element 35 having a voltage of such a value that tunneling or current flow will only occur through the single conductor of column R–1, then during a complete cycle or sweep of the brush, current will only flow during its travel across the single surface element or assembly of R–1 and a pulse or signal will appear on line 42–1 which extends to output B–1 of the parallel arrays of outputs designated by the notation 41. If the current present on the brush 34 has a voltage sufficient to cause flow thereof through the dielectric films of columns R–2 and R–1 then the brush element will cause line 42–2 to become energized when in alignment with column R–2 providing the binary notation "10" before sweeping on to column R–1. When the brush 35 is in alignment with column R–3 it simultaneously contacts surface conducting elements in rows C–1 and C–2 which are respectively connected to the binary outputs B–1 and B–2 which, if current tunnels through the dielectric film thereof provide the binary notation "11." When in alignment with column R–4, the brush contacts the surface element in row C–3 which is connected to the binary output B–3 which, if energized, provides the binary notation "100." The surface conducting elements of column R–5 are respectively connected to the binary outputs B–3 and B–1 giving the binary notation "101." Similarly, column R–10 has surface conducting elements and lower conductors 33 which are respectively connected to the binary outputs B–2 and B–4 for providing the binary notation "1010," etc. In other words, during a clockwise or left to right sweep of the brush or energizing beam having the unknown voltage, the first energization of a particular output circuit will indicate in binary form the column or position of the brush at which the voltage was sufficient to tunnel through the dielectric interlayer of such column and may be used as a direct indication of the voltage after calibration of the device. The sweep of the brush or beam may continue in the rightward or clockwise direction for certain applications of the device or it may be desired to immediately reset the beam or brush to a home or zero position. Means are provided in FIG. 6 for the automatic resetting of the brush by energizing the reverse or reset control 36R of the servo 36 which drives the brush. Connected to each of the output lines 42 are respective circuits 43 which connect through a single circuit 43' which is connectable through a switch 44 to the reset control 36R of the sweep servo. Thus the first current tunneling through the film of a particular column is gated to reset the brush by reversing its servo so that only one binary code, that which indicates the particular column at which tunneling first occurred, appears on the parallel output circuits 41. The switch 44 may be thrown to gate the first signal to the stop control 36S of sweep servo 36 which may be started thereafter by manual switches 45 or 46 which are respectively connected to the reverse or reset control and the forward start control 36F. The switches 45 and 46 may also comprise output circuits of a computing device or other device. It is also to be noted that the device 40 of FIG. 6 may be utilized for generating a particular parallel binary code or codes by gating a known voltage or voltages to the brush element 35.

The device of FIG. 6 may also be used as a coding disc such as used in an analog to digital converter for the presentation of binary codes which are indicative of only certain portions of an incoming signal or signals, i.e., those which are below a particular maximum voltage. The sandwich assemblies 32 may be of variable or varying circumferential extension as in a conventional coding disc with the dielectric film associated with each surface conductor or segment of the disc being of a constant thickness but different from those of adjacent films.

In the devices of FIGS. 1 to 3, signals to be sampled delayed, segmented into pulse trains or otherwise operated upon may be generated as an electron beam made to sweep the length or a predetermined segment of the surface of either member 20 or tapered film 18. In other words, the assembly 10 may be operated either as an electro-mechanical or beam device. If intersected or swept by an electron beam, conducting strip 20 may be utilized or may be eliminated whereupon the outer surface of tapered dielectric film may be exposed and adapted to receive the beam for performing the function described. The strips of conductors forming the assemblies hereinbefore described may have other configurations than those illustrated and may be radially disposed on the surface of a disc or a rotating drum. They may also be provided in a vacuum chamber or inert atmosphere, particularly if a beam or other electrical discharge means is employed to scan the surface or surfaces of the components thereof. Other switching and output arrangements than those illustrated are also possible for performing various functions utilizing the tapered and multi-layered constructions shown.

In the arrangements of FIGS. 4 to 6, an electron beam or other non-contacting electrical device or stream of mercury may be employed for scanning purposes whereupon the surface conducting elements 32 may be eliminated from each assembly 34.

Figure 7:
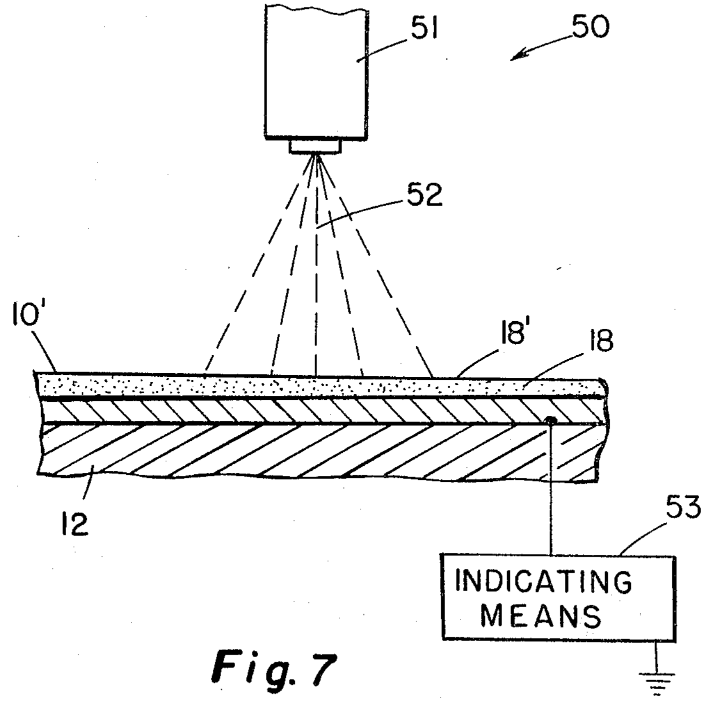
FIG. 7 is a plan view showing a modified form of the invention employing an electron beam generating means as a component of the electrical device.

In FIG. 7 is shown a modified form of the invention employing an electron beam as described above for scanning an electrical device including a tapered dielectric film. The device 50 which includes an electron gun 51, is shown disposed above a composite assembly 10' including a substrate 12, a flat electrical conductor 15', such as the described thin strip or metal, which is bonded to the upper surface of substrate 12 and tapered dielectric film 18 bonded to the outer surface of conductor 15'. The electron beam 52 generated by electron gun 51 may be directed against a selected area of the upper surface 18' of tapered film 18 at varying potential whereby the film 18 passes to the conducting layer 15' the potential of beam 52 only when said potential is above a minimum value at the particular film location above which current flows to the base conductor 15'. Connected to conductor 15' is a indicating means 53 such as hereinabove described which is operative to indicate when a current generated by said electron beam flows through the tapered film 18 to the conductor 15'.

Figure 8:
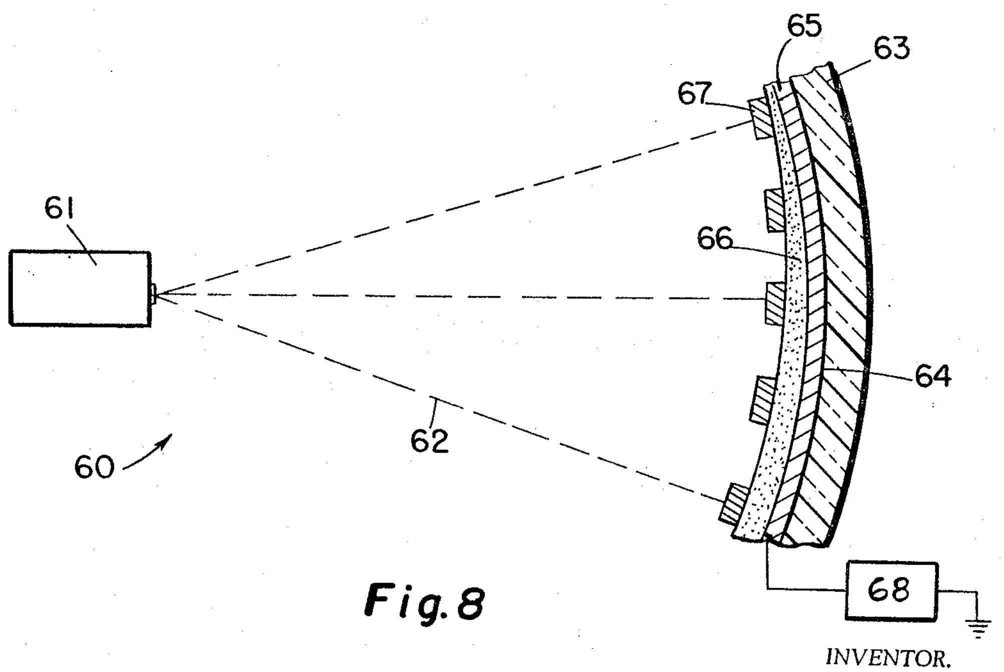
FIG. 8 is a modified form of the device of FIG. 7.

A modified form of the apparatus of FIG. 7 is shown in FIG. 8 in which an electron beam is generated within a cathode ray tube device 60 and is directed against different targets situated within the cathode tube. A conventional cathode ray beam generating and deflection control means 61 is shown spaced from the front face or target wall 63 of the cathode ray tube. Disposed adjacent the inside surface 64 of the cathode ray tube 63 is a first electrical conducting layer 65. Disposed against the inside surface of layer 65 is a tapered dielectric film layer 66 as described. Secured to the inside surface of the dielectric film 66 are a plurality of second conductors 67 against each of which the deflection controlled electron beam 62 may be directed. Connected to the first conducting layer 65 which abuts the face 63 of the cathode ray tube is an indicating means 68 which indicates when the beam intersects a conductor 67 which is aligned with a portion of the tapered film 66 of such a thickness as to permit passage of electrical energy to the conductor 65.

Other uses for the new electrical assemblies and components illustrated in FIGS. 1 to 6 and the described variations therein include their applications as variable potentiometers, variable signal clippers, digital voltmeters, variable delay lines, pulse train generators and the like. For example, if an electron beam of unknown voltage is caused to longitudinally sweep the upper surface of the tapered dielectric strip 18, assuming that outer conducting strip 20 of device 10 of FIG. 1 has been omitted, then an amplitude variable signal or pulse train will be generated on output line 24, the duration or pulse count of which will be in indication of the voltage of the beam. In other words, conduction of current through the tapered dielectric or semi-conducting layer 18 will only occur to those strips of the bank 15 which are capped or covered with material 18 of a thickness permitting tunnelling. Thus by clipping the signal generated on output line 24 to generate a train of pulses or counting the pulses generated at the output of line 22, the number of pulses so generated will be an indication of the voltage and may be used to operate a counter or visual display device or may be converted to binary form and fed to a computer or recorder.

By varying the position of a wiper arm such as arm 34 of FIG. 5 and adjusting it to engage a particular sandwich assembly 32 or to be positioned at a predetermined location along the tapered dielectric or semi-conducting element 18 of FIG. 1 (assuming that strip 20 is not present), a voltage control device or voltage regulator is attained since the voltage generated on the output of the device (line 24 for example) will be a function of the location of the wiper element (i.e. the resistivity of the material of layer 18 disposed between the wiper element and the strip elements 15 (FIG. 1) or 33 (FIG. 4)).

In the apparatus of FIG. 5, if the wiper arm is manually positionable to attain a set position with respect to one of the assemblies 32, a device which is equivalent in operation to a variable thyratron circuit is attained in which the output device 39 may comprise a relay which is activated by any pulse generated on line 33′. The voltage at which the device will trigger or conduct will be a function of the thickness and resistivity of the resistance layer 18′ of the particular sandwich assembly 32 against which the wiper or contact arm 35 is resting. If the signal generated by signal generator 38 is an analog signal, it may be clipped at a particular amplitude or voltage depending on the resistivity of the material 18′ of the assembly 32 on which contactor 35 is engaged. In other words, the device defined in FIG. 4 may be used as a variable signal clipper.

The devices illustrated in FIGS. 1, 4 and 5 or modified arrangements utilizing such constructions may be used to control voltage for the control of motors and other devices as well as means for effecting variable speed control for motors which are operable by means of a pulsed input current and/or a variable input voltage.

In still another form of the invention, if the material comprising layer 18 of FIG. 1 or layers 18′ of FIG. 4 is a semi-conducting material which is not sensitive to polarity and can be selectively and reversibly changed from a high resistance state, such as 10 megohms or more, to a low resistance state such as one ohm or less, then the devices illustrated may comprise variable threshold switching arrangements and may be utilized for the selective and variable control of alternating current in a variety of applications. Since the film of semi-conducting material is varied in thickness along its length or from assembly to assembly, the voltage at which the switch conducts will be a function of the location of the contact arm 35 (which may be adjustably positionable along the upper surface of tapered layer 18 of FIG. 1 or against a selected one of the upper surfaces of layers 18′ of FIG. 4) provided that the pressure of arm 35 against the upper surface or surfaces is constant throughout the range of its adjustment and temperature is maintained constant.

The various control and indicating devices hereinbefore described utilizing a dielectric material as the tunnelling medium may be modified in which the tunnelling medium comprises or is replaced by a vacuum deposited semi-conducting material to provide essentially variable threshold switching devices operative as described or in accordance with the characteristics of the conventional threshold device in which the switch has a very high resistance at low alternating current (input) voltages (from 1 to 100 megohms) wherein no current flows in the output circuit. When the input voltage is raised to an upper threshold value (depending upon the thickness of the semi-conducting layer, temperature, etc.) such as in the range of 5 to 200 volts r.m.s., the switch is actuated and its resistance drops to one ohm or less. Thus the position of the wiper arm or contactor 35 along the upper surfaces of semi-conducting layers 18′ or the tapering semi-conducting layer 18 will determine the voltage at which the switch is actuated which may be used for variable control purposes or as an indication of the voltage of the input signal. By moving the wiper arm 35 or a beam of unknown voltage across the surfaces of either elements 18′ or 18, the location of the wiper arm or beam at which firing occurs will be an indication of the alternating current voltage of the input signal. Conversely, prepositioning the wiper arm at a selected point along the surface of semi-conducting, tapered element 18 or selected ones of the surfaces of the separated semi-conducting segments 18′ will result in a control device which will be actuated or provide a signal at its output only when the input voltage attains a predetermined value which may be varied as described over a predetermined range. Such a device may be used for the control of motor speed using alternating current wherein only portions of the alternating current signal are used to power the motor (i.e. those portions conducted through the threshold switch until the lower threshold determined by the thickness of layer 18 (or 18′) is reached).

If the arrangements of FIG. 1 or FIG. 4 are to be utilized as variable threshold switching devices, the outer conducting layers 20 and 32 are preferably omitted and the outer surfaces of layers 18 and 18′ are preferably disposed on the substrate with respect to the wiper element or adjustable contactor 35 so that the latter will engage the surface or surfaces of the threshold device(s) with a constant force throughout its range of movement since the threshold switch is pressure sensitive and the actuating voltage is also a function of pressure between input conductor and the semi-conducting material.

Threshold switching devices of the type hereinabove described may be utilized as means for digitally indicating temperature since, as the temperature of the switch increases, the voltage necessary to actuate the switch drops somewhat proportionately. By varying the voltage of the signal passed through the input to the switch, a voltage will be reached at which the switch will not conduct. This voltage will be an indication of the temperature of the switch. By generating a series of codes each of a different voltage and each preferably of an increment or decrement in voltage than the prior voltage of the prior code, then that code which first passes through the threshold switch will be a code indication of the temperature of the switch and the device may be used as a digital indicator of temperature. Such codes may be generated by a rotary code generating disc and passed to a threshold switch of conventional design per se or to elements of the types illustrated in either FIGS. 1 or 4.

Reference is made to an article appearing in the April 1964 issue of Control Engineering Magazine for further details of the threshold switch and its operating characteristics.

I claim:

1. An electrical device comprising:

(a) a base member, of self-supporting material, defining a substrate, (b) a first conductor deposited on said base member as a thin strip and bonded to a surface thereof, (c) a layer of material less than .00001" in thickness and operative to tunnel electrons, said material being deposited as a tapered film over said first conductor, (d) a second conductor bonded on top of said film material and held in spaced relation thereby away from said first conductor, (e) an input lead connected to one of said conductors, (f) an output lead connected to the other conductor, (g) said film material being of such varying thickness that it will conduct current therethrough between said two conductors when said current is above different specified minimum voltages along the tapered length of said film, (h) and means connected to said input lead for generating a voltage variable signal at least part of which is of a voltage such that it will pass through at least a portion of said film material.

2. An electrical device comprising in combination with a first electrical conductor, a dielectric material in the shape of a thin film deposited on said first conductor, which film varies in thickness along different portions of said first conductor, a second electrical conductor disposed on the outer surface of said film forming a sandwich array therewith, the thickness variation of the dielectric film being such that an electric current may be made to tunnel through said dielectric film from said second to said first conductor with the amount of current flow being a function of its voltage, and an electrical wiping means supported above said second conductor which includes a means adapted to be moved across said second conductor, and an indicating means for indicating the flow of current through said die-electric film, said indicating means including a variable energizing means which is responsive to the position of said wiper means against said second conductor.

3. An analog to digital convertor comprising in combination with a base, a plurality of first electrical conductors having wiping surfaces disposed in a predetermined path and a given plane secured to said base, a dielectric film covering at least part of each of said conductors with the thickness of said film varying from one conductor to the next, a further electrical conducting means disposed above said dielectric film and secured in surface abutment therewith immediately above said plurality of conductors, an electrically conducting wiper means fixedly supported relative to said base and having a wiper portion thereof adapted to travel in a fixed path across said electrical conducting means, each of said conductors hav- respective output means fo renergizing respective circuits, the thickness of said dielectric film above each of said conductors being such that it will permit the passage of a current of a particular voltage therethrough to its associated conductor of said electrical conducting means in a tunnelling action which begins at a voltage which is different from the voltage at which tunnelling first occurs through the other of said conductors, and means for electrically connecting said wiper means in a circuit which includes a power supply and said further electrical conducting means in a series circuit therewith which is interrupted by said dielectric film.

4. A voltage indicating device comprising in combination with a plurality of first electrical conductors having closely spaced portions arranged in a predetermined path on an insulated support therefor, the upper surfaces of said closely spaced portions of said first conductors being in substantially the same plane or surface, each of said closely spaced portions of said conductors having their outer surfaces insulated with a thin dielectric film thickness of which varies substantially proportionately from one conductor to the next, a plurality of second conductors including portions thereof in surface abutment with those portions of the insulated film which are lined with said first conductors, said second conductors being thereby insulatedly supported off said first conductors, the upper surfaces of said second conductors being exposed and being substantially in the same plane or surface whereby they may be swept by an electrical brush or contractor, a means for sweeping said second conductors one at a time and for electrically energizing each as it is being swept with a signal of substantially constant voltage which signal will tunnel through certain of said dielectric films while being prevented from passing to the first conductors by others of said films, and means for indicating which of said dielectric films the signal first passed through.

5. An electrical device comprising in combination with a first electrical conducting means, an insulating means in the form of a tapered dielectric film disposed on one surface of said electrical conducting means, an electron beam generating means, means for directing the electron beam of said generating means against said dielectric film at different potentials, certain of which are of sufficient intensity to cause electrons to pass through said dielectric layer to said first conducting means, and an indicating means connected to the other surface of said first conducting means for indicating when a current generated by said electron beam is flowing to said first conductor.

6. An electrical device comprising a cathode ray tube, a first conductor disposed within said tube with one of its surfaces in opposed relationship with the face of said tube, an insulation layer on the other surface of said first conductor, said insulation layer being tapered in thickness to provide different degrees of insulation for said first conductor, a plurality of second conductors on said insulation layer in a given array, means for generating an electron beam within said tube and for positionally controlling said beam to cause it to selectively impinge on predetermined ones of said second conductors, means for varying the potential of said beam, and means for indicating the potential of said beam, said potential indicating means being operatively connected to said first conductor.

7. An electrical device comprising in combination:

(a) a substrate, (b) a plurality of discrete first conductors insulated from each other and supported by said substrate, (c) a quantity of thin-film tunneling material disposed on top of each of said first conductors and varying in thickness from conductor to conductor, (d) a plurality of second conductors each disposed above the thin tunneling material on said first conductors so as to form a plurality of discrete multilayer formations with each formation having a first and a second conductor separated from each other by tunneling material of different thicknesses, (e) said film material offering resistance to current flow and operative to tunnel current between said second and said first conductors in accordance with the thickness of said film material, (f) means selectively applying electrical signals to said second conductors, and (g) means for indicating through which of said tunneling films of said multi-layer formations said signals pass so as to provide an indication of the voltage of said signals.

8. An electrical device comprising in combination, a first electrical conductor, a dielectric material in the shape of a thin film deposited on said first conductor, said film varying in thickness along different portions of said first conductor, a second electric conductor disposed on the outer surface of said film and forming a sandwich array therewith, the thickness variation of the dielectric film being such that an electric current may be made to tunnel through said dielectric film from said second conductor to said first conductor with the current flow being a function of its voltage, and a movable electrical current conducting means supported above said second conductor for conducting current to said first conductor, means for moving said current conducting means to sweep past and electrically scan different portions of said second conductor and an indicating means connected to said first conductor for indicating the flow of current through said dielectric film.

9. An electrical device comprising:
(a) a base member of self-supporting material defining a substrate,
(b) a first conductor in the form of a thin strip bonded to a surface of said base member,
(c) a layer of material operative to tunnel electrons, said material being deposited as a tapered film on said first conductor,
(d) a second conductor bonded on top of said tapered film and held in spaced relation thereby away from said first conductor,
(e) an input lead connected to one of said conductors,
(f) an output lead connected to the other conductor,
(g) said film material being of such varying thickness that it will conduct current therethrough between said two conductors when said current is above different specified minimum voltages along the tapered length of said film,
(h) means connected to said input lead for generating a voltage variable signal at least part of which is of a voltage such that it will pass through at least a portion of said film material, and
(i) utilization means connected to said output lead for receiving the signal passed through said film,
(j) said utilization means being variable in its operation in accordance with variations in the voltage of the signal passed through said film.

References Cited

UNITED STATES PATENTS

| | | | |
|---|---|---|---|
| 1,520,329 | 12/1924 | Cherpeck | 317—249 |
| 2,755,457 | 7/1956 | Diemer et al. | 324—122 X |
| 2,884,085 | 4/1959 | Wittern | 324—103 X |
| 2,922,730 | 1/1960 | Feldman | 317—234 |
| 2,974,075 | 3/1961 | Miller | 148—6.3 |
| 2,997,651 | 8/1961 | Richeson | 324—103 |
| 3,048,787 | 8/1962 | Pachuta | 324—121 X |
| 3,056,073 | 9/1962 | Mead | 307—88.5 |
| 3,121,177 | 2/1964 | Davis | 317—234 |
| 3,125,721 | 3/1964 | Schumann | 324—103 |
| 3,130,348 | 4/1964 | Lieb | 315—169 X |
| 3,141,107 | 7/1964 | Wasserman | 324—76 X |
| 3,147,154 | 9/1964 | Cole | 148—6.3 |
| 3,187,193 | 6/1965 | Rappaport | 317—235 |
| 3,218,635 | 11/1965 | Masur | 340—347 X |

WALTER L. CARLSON, *Primary Examiner.*

FREDERICK M. STRADER, *Examiner.*

J. J. MULROONEY, *Assistant Examiner.*